United States Patent [19]
Boyer

[11] Patent Number: 5,963,003
[45] Date of Patent: Oct. 5, 1999

[54] METHOD AND APPARATUS FOR ASYNCHRONOUS MULTI-AXIS SERVO PATH PLANNING

[75] Inventor: Bradley R. Boyer, Clawson, Mich.

[73] Assignee: Allen-Bradley Company, LLC, Milwaukee, Wis.

[21] Appl. No.: 09/064,939

[22] Filed: Apr. 22, 1998

[51] Int. Cl.[6] .................. G05B 19/416; G05B 19/4099
[52] U.S. Cl. .................. 318/574; 318/570; 318/568.23
[58] Field of Search .................. 318/560, 561, 318/568.22, 568.23, 569, 570, 571, 574, 575

[56] References Cited

U.S. PATENT DOCUMENTS

| | | | |
|---|---|---|---|
| 3,576,979 | 5/1971 | McCall et al. | |
| 3,878,983 | 4/1975 | Hamill, III et al. | 318/569 X |
| 4,199,814 | 4/1980 | Rapp et al. | 318/568 X |
| 5,121,040 | 6/1992 | Takizawa et al. | 318/574 |
| 5,550,448 | 8/1996 | Ferragina | 318/569 |

*Primary Examiner*—Bentsu Ro
*Attorney, Agent, or Firm*—William R. Walbrun; John M. Miller; John J. Horn

[57] ABSTRACT

A motion controller includes an input for receiving data corresponding to moves in a cycle of a multi-axis machine. The controller controls electric motors of the machine in accordance with positions set forth in a path planning table. The path planning table is generated from the data by applying a curve defining equation and integrating an alpha variable therein. The alpha variable corresponds to a velocity to acceleration ratio and is adjustable to allow the calculation of a new path planning table having a velocity and acceleration profile shifted from an initial velocity and acceleration profile to allow for optimization of motor performance. A method of path planning having user tunable parameters is also provided.

18 Claims, 7 Drawing Sheets

FIG. 6C

METHOD AND APPARATUS FOR ASYNCHRONOUS MULTI-AXIS SERVO PATH PLANNING

BACKGROUND OF THE INVENTION

1. Field of the Invention

The present invention relates generally to motion control systems providing real-time control of industrial servo motors. More particularly, the invention pertains to a motion control system and method for providing improved control and performance in a multi-axis servo motor system.

2. Description of the Prior Art

In industrial automation applications, motion control systems are often used to control servo motors of an industrial machine to provide for accurate and repeatable positioning of moving machine parts and workpieces.

Multi-axis motion occurs when two or more axes of motion are involved in a single machine. The need for multi-axis synchronization arises when the axes must move together and the relationship between their respective motion is important. The position and velocity relationship between the axes will often be significant to the proper operation of the machine. Position coordination during motion may be required, for example, to avoid a collision between a moving machine part and another object. Accordingly, where multiple axes control the orientation of a moving part, the position and velocity synchronization of the axes will determine how accurately the part is oriented as it moves.

A typical motion control system consists of a motor, motor drive, and a motion controller. The controller accepts motion commands from a host computer or an internally stored program These commands are interpreted by the controller to generate continuously updated position commands to the drive. The motor drive controls the current and frequency to the motor, which will result in the commanded position. In a multi-axis system, one controller can control several motors and drive combinations, or alternatively separate controllers can be operated under the control of a central control system Electronic feedback systems are employed by the controller, either from an incremental encoder or from a resolver. The actual position and velocity of the motor derived from the feedback is compared with that commanded in the motion profile during the controlled operation.

In an asynchronous multi-axis control system, a series of moves are provided for each axis within a table. Each move typically includes a starting time, ending time, and a distance to be traveled. In operation, the moves for each axis will operate in an asynchronous fashion to one another.

Typical prior art motion control systems have a basic acceleration/steady-state/deceleration motion profile. During the steady-state velocity portion of the profile where the velocity is constant, the applied acceleration or force is equal to zero. When the applied force is zero, the only force remaining is due completely to mechanical compensation through a PID loop. In other words, the machine is operating in a random compensation mode, which has been found to prematurely wear the mechanical system.

As will be described in greater detail hereinafter, the method and apparatus of the present invention solves the aforementioned problems by substantially eliminating the steady-state velocity from a move and employs a number of novel features that render it highly advantageous over the prior art.

SUMMARY OF THE INVENTION

Accordingly, it is an object of this invention to provide a motion control system and method for asynchronous multi-axis servo path planning.

Another object of this invention is to provide a motion control system that increases motor efficiency and reduces mechanical wear.

Still another object of this invention is to provide path planning that substantially eliminates the steady-state velocity from a move during operation so that force is maintained on all backlash devices of the operating machine, such as pulleys, reducers, ball screws, and the like.

Yet another object of this invention is to provide a system and method of motion control that allows for tunable adjustment of the acceleration to velocity ratio and allows for machine inertia compensation.

To achieve the foregoing and other objectives, and in accordance with the purposes of the present invention a motion controller is provided for multi-axis control of electric motors of a multi-axis machine. The controller includes an input for receiving data corresponding to moves in a cycle of the multi-axis machine. The controller controls the motors of the machine in accordance with positions set forth in a path planning table. The path planning table is generated by the controller by iteratively applying a curve defining equation and integrating an alpha variable therein. The alpha variable corresponds to a velocity to acceleration ratio and is adjustable to allow for the calculating of a new path planning table having a velocity and acceleration profile shifted from an initial velocity and acceleration profile to allow for optimization of motor performance.

In accordance with the present invention, a method of multi-axis path planning in a motion control system includes the following steps: inputting data corresponding to a series of successive moves in a cycle of a multi-axis machine; setting an alpha variable to a predetermined value; generating a path planning table from the data to determine positions defining a path of the cycle by applying a curve defining equation and integrating the alpha variable therein, the alpha variable corresponding to a velocity to acceleration ratio; determining a rate of speed for traversing along the path planning table during machine operation; determining motor performance criteria during machine operation; and modifying the alpha variable in response to the performance criteria and generating a new path planning table having a velocity and acceleration profile shifted from the initial velocity and acceleration profile.

In accordance with another aspect, the method of the present invention includes the steps of setting a beta variable to a predetermined value and integrating the beta variable into the curve defining equation. The beta variable corresponds to an acceleration to deceleration ratio. The value of the beta variable is adjustable to allow for an optimal setting thereof corresponding to a shift in the velocity to acceleration profile and the acceleration to deceleration profile providing user adjusted compensation for high inertia load of the machine.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENTS

Figure 1:
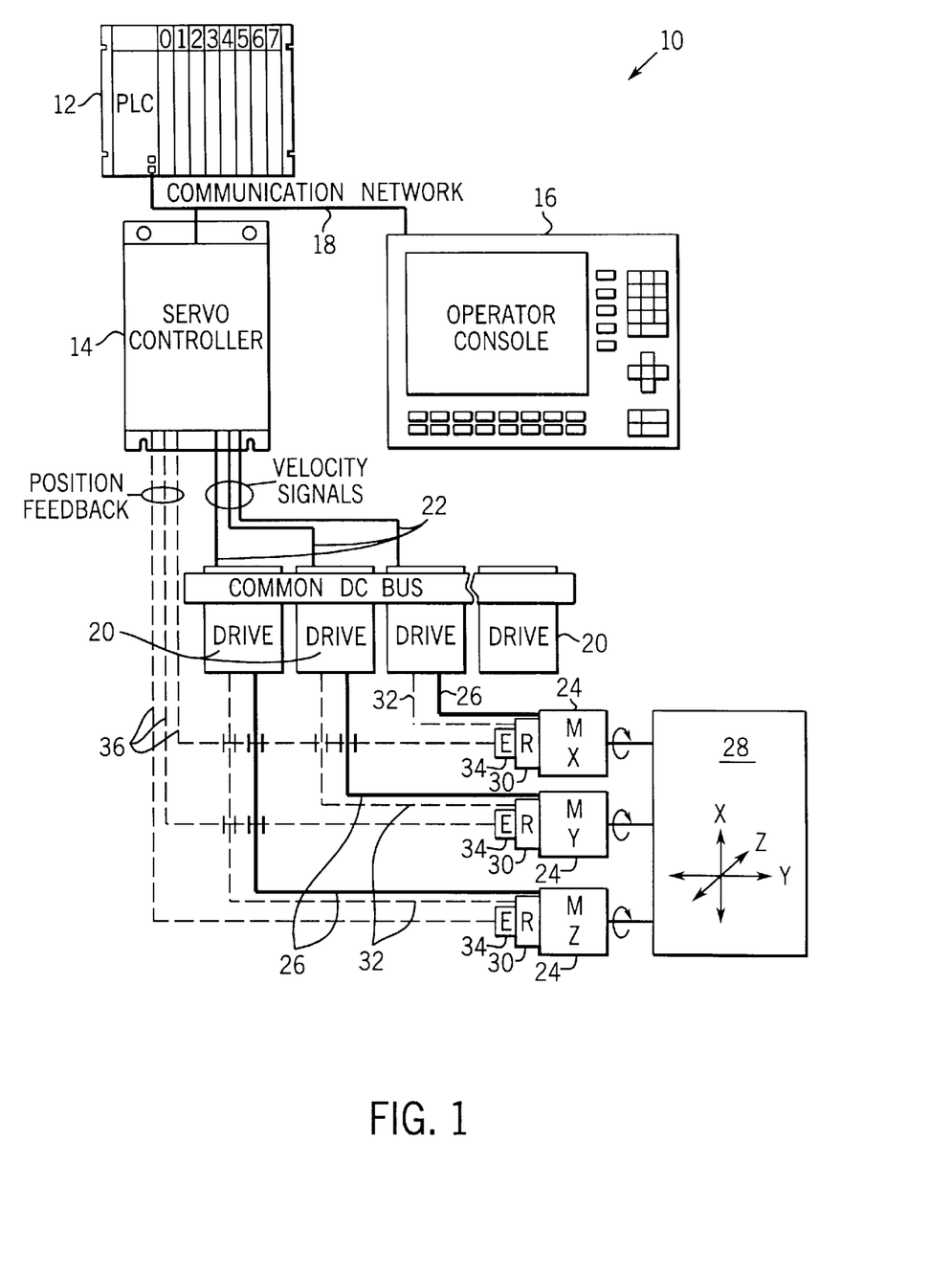
FIG. 1 is a block diagram of an exemplary motion control system in which path planning in accordance with the present invention may be implemented.

Referring now to the drawings, an exemplary motion control system 10 is illustrated in FIG. 1 in which path planning in accordance with the present invention may be implemented. The system 10 includes a central controller 12, such as a personal computer or PLC, a servo controller 14, and an operator console 16 for interfacing with the controllers 12,14. The controllers 12,14 and operator console 16 are interconnected through a conventional communication network 18.

The servo controller 14, which will be described in greater detail below, is connected to motor drivers 20 across ±10 VDC lines 22 to pass velocity signals or commands generated by the controller 14 corresponding to position values read by the controller from a path planning table, which is described in more detail later. A common DC Buss connects the drivers 20 together. Each motor driver 20 is connected to a motor 24, such as a servo motor, through lines 26 to allow the driver to control the current and frequency of the motor 24 based on the commands received from the controller 14. A separate motor 24 and driver 20 is needed for movement of each axis of a multi-axis machine 28. It should be understood that any number of motors and drivers could be employed in accordance with the teachings of the present invention to provide a system having motion control in a corresponding number of desired axes.

Each motor 24 includes a resolver 30 of conventional type connected to a corresponding motor driver 20 across lines 32 and a feedback device 34, such as a conventional encoder, which is connected to the servo controller 14 across feedback signal lines 36 to provide feedback signals representative of the position of the motor 10 and the axis of the machine 28 being moved.

In one preferred embodiment, the central controller 12 is of the type commercially available under the designation "PLC 5/40," the operator console is of the type commercially available under the designation "PanelView 1400e," the servo controller 14 is of the type commercially available under the designation "1394 Multi-Axis Motion Control System," which includes the controller 14 and drivers 20, and the motors 24 are of the type commercially available under the designation "1326AB," all of which are sold by the Allen-Bradley Company, Inc. of Milwaukee, Wis., an assignee of the present application.

Figure 2:
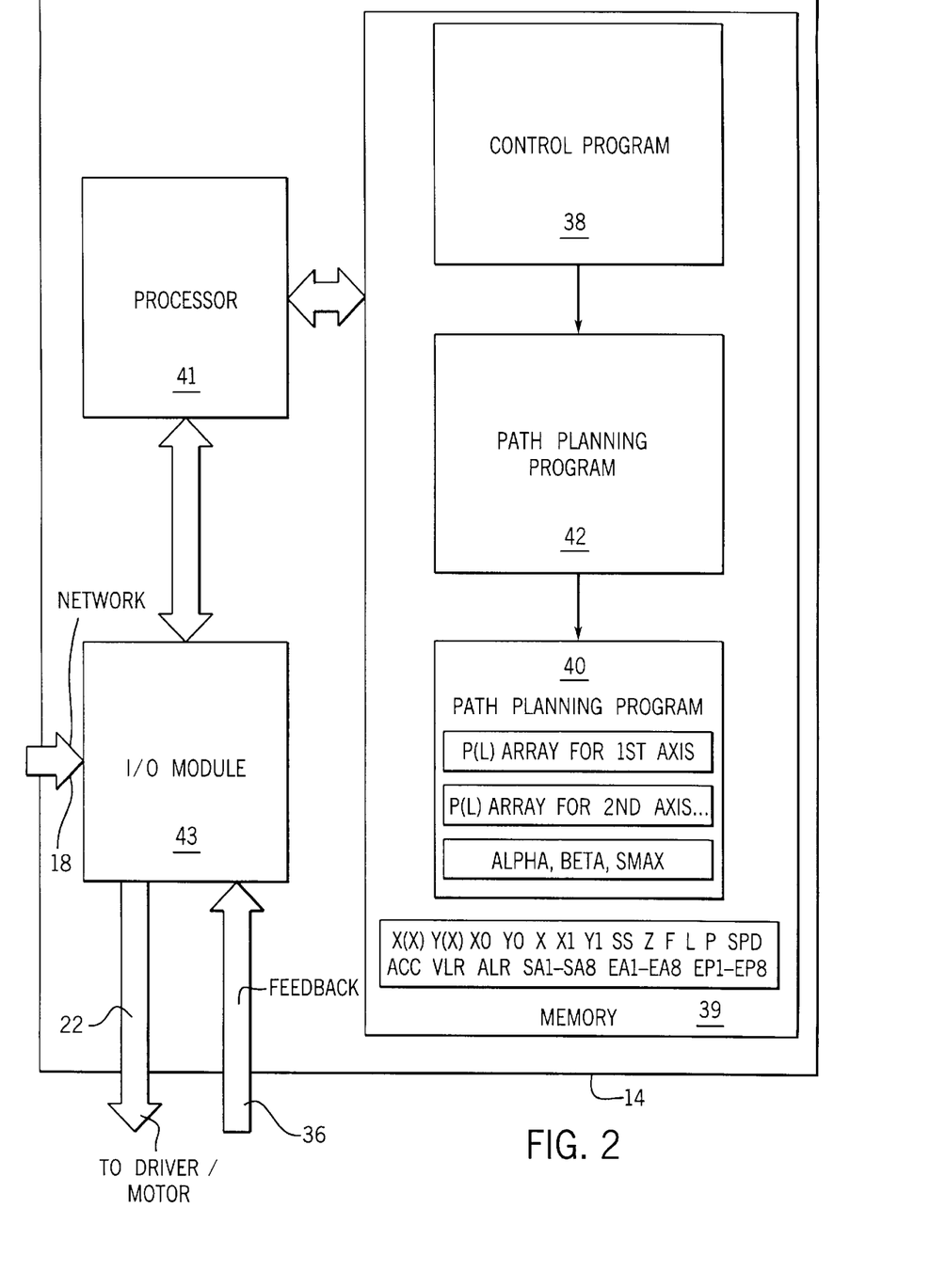
FIG. 2 is a block diagram of elements residing or being stored within the servo controller of the present invention.
Figure 3:
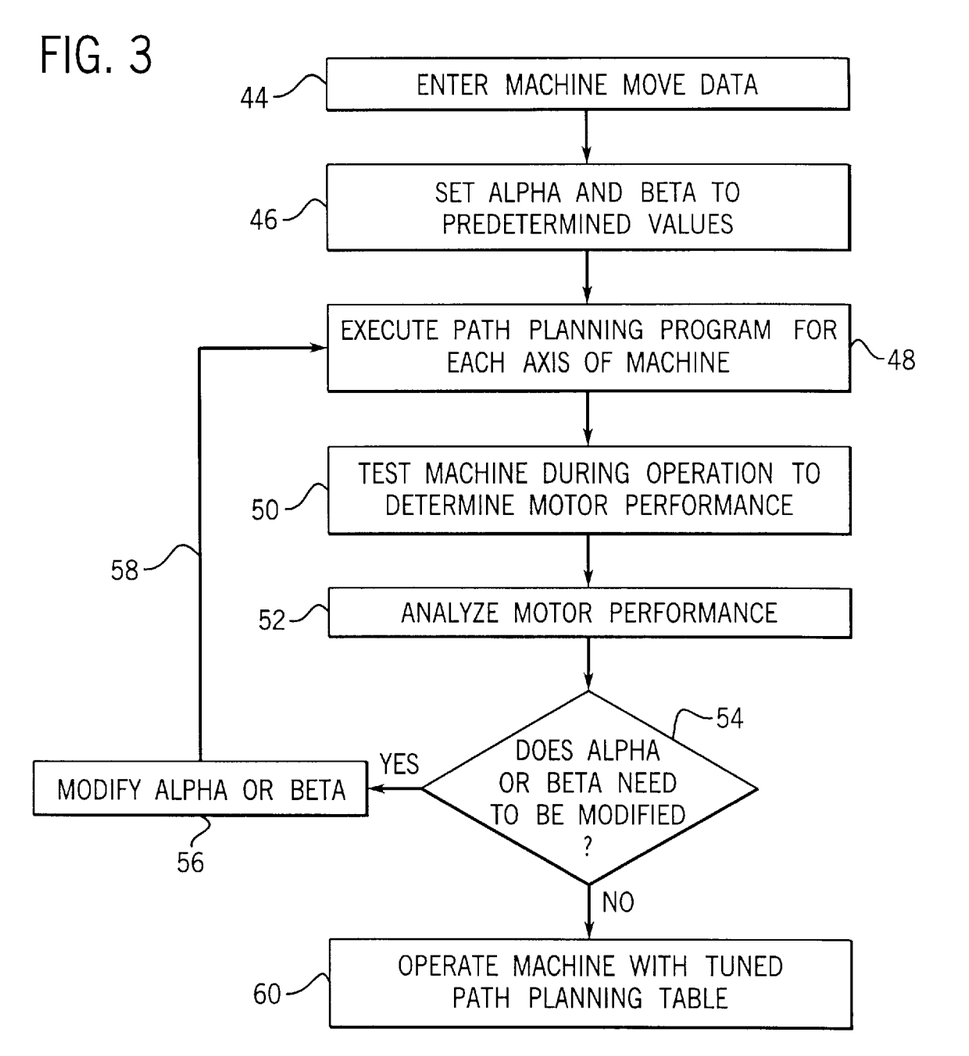
FIG. 3 is a flowchart illustrating steps carried out in accordance with a method of the present invention.
Figure 4A:
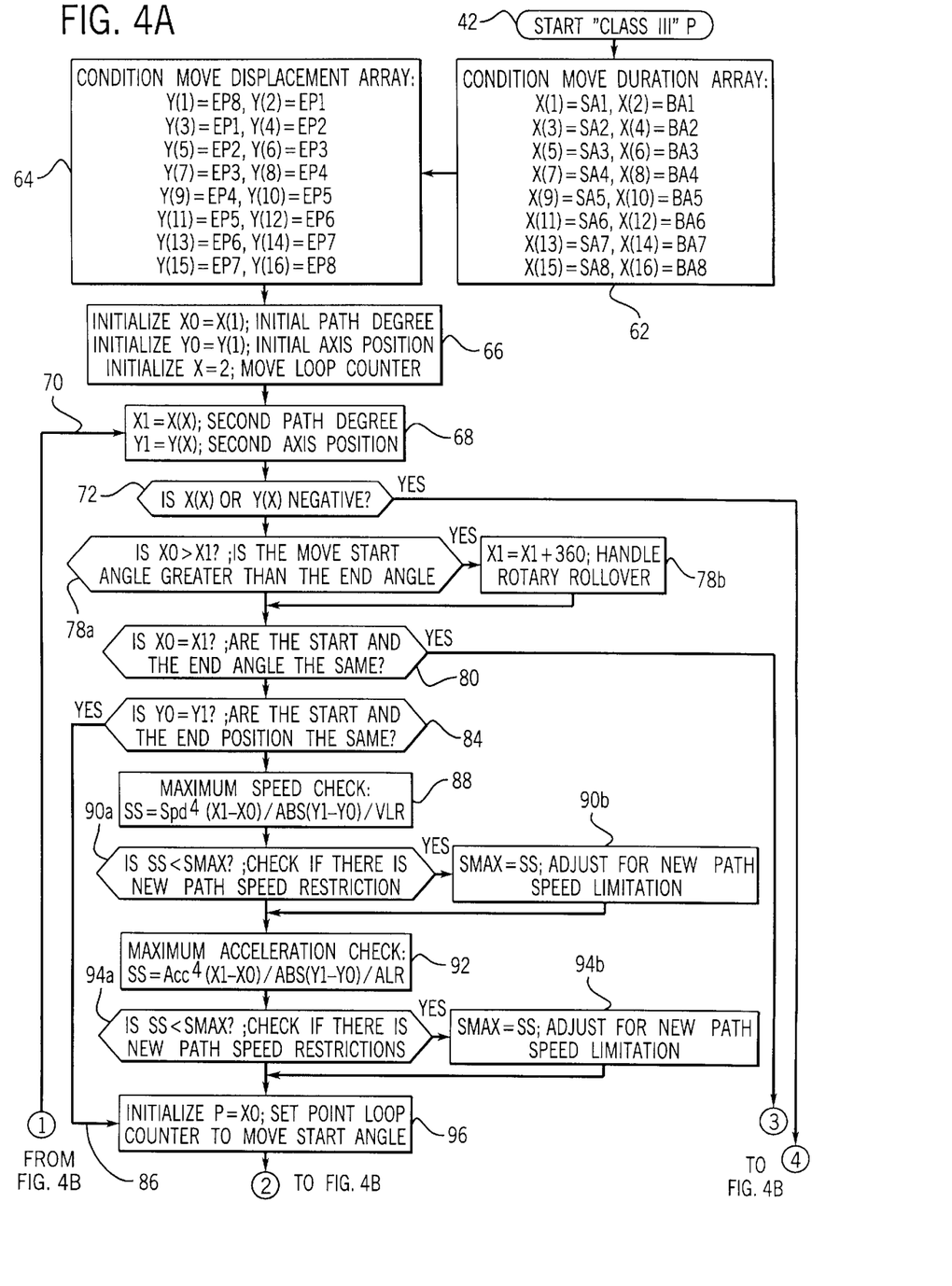
FIG. 4 is a flowchart illustrating steps carried out in a path planning program of the present invention.
Figure 4B:
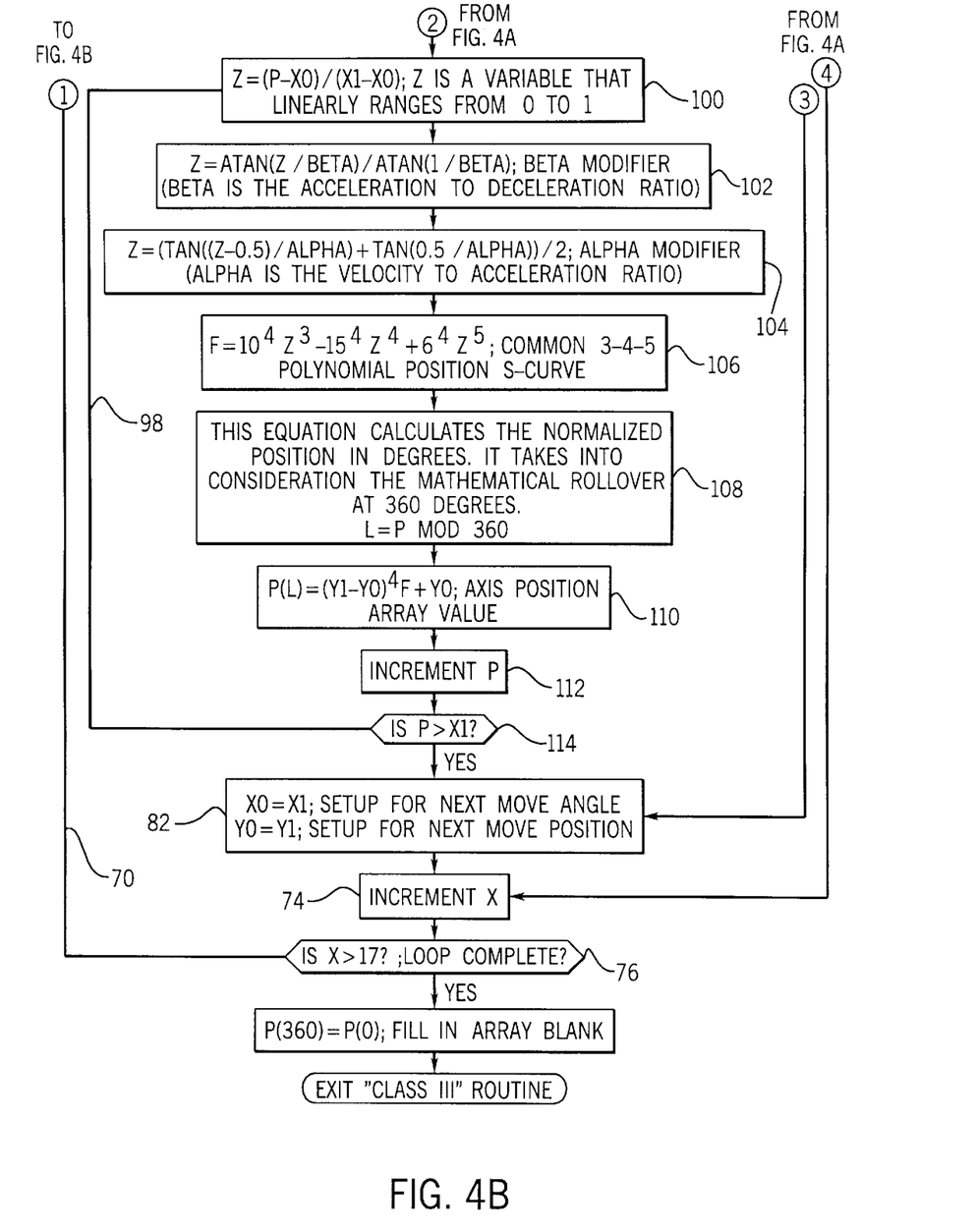

Referring to FIG. 2, the servo controller 14 includes a control program 38 residing within memory 39, such as RAM or ROM, which executes the positions contained in a path planning table 40 which also resides within memory 39 of the controller 14. The path planning method and resulting system of the present invention may be implemented by first downloading a path planning program 42 into the memory 39 of the controller 14 through the I/O module 43 of the controller 14. The path planning program 42 allows for creation of the path planning table 40 which is executed by the processor 41 of controller 14 in a known manner during machine 28 operation. It should be noted that while a conventional servo controller 14 is being utilized, the path planning program 42 of the present invention stored within the controller 14, as well as the steps illustrated later in FIGS. 3–4 are not part of the conventional controller referred to above.

In the following description and within the program 42 flowchart, numerous specific details are set forth in order to provide a thorough understanding of the present invention, as well setting forth an example implementation. It will be obvious, however, to one skilled in the art that the present invention may be practiced without some of these specific details and could be used for any desired motion control application. In other instances, well-known circuits, structure and techniques have not been shown in detail, in order not to unnecessarily obscure the present invention.

In the set-up of a motion profile for a particular application, a user will enter data on the operator console 16 which can be stored in the memory 39 of the controller 14. The data represents a series of successive moves of the machine 28 along a complete cycle of the general desired path to be repeatably followed during machine operation. In a preferred embodiment illustrated below, the data for each successive move includes a starting angle, ending angle, and displacement or distance value. The data is preferably selected by a user such that the moves correspond to a complete cycle of movement where the ending position of the last move will bring the machine to the starting position for the first move. While each move is typically asynchronous such that there are separate acceleration and deceleration profiles for each move, it should be noted that overlap of acceleration and deceleration profiles for successive moves can occur between the various axes of motion.

The following Table A illustrates sample data for an example motion profile to be calculated.

TABLE A

Sample Data:
SA1, EA1, EP1: 0, 40, 60
(Cycle Move #1; This move starts at 0°, ends at 40° and moves to 60")
SA2, EA2, EP2: 60, 100, 30
(Cycle Move #2; This move starts at 60°, ends at 100° and moves to 30")
SA3, EA3, EP3: 100, 0, 0
(Cycle Move #3; This move starts at 100°, ends at 0° and moves to 0"
SA4, EA4, EP4: −1, −1, 0 (End of Move Table Delimiter)
SA5, EA5, EP5: −1, −1, 0
SA6, EA6, EP6: −1, −1, 0
SA7, BA7, BP7: −1, −1, 0
SA8, EA8, EP8: −1, −1, 0

In the foregoing sample data, three moves within a complete cycle have been determined by the user. Where the memory array within memory 39 holding the data may be configured to hold entries greater than that needed by the user for the particular desired motion application being set, data terminators may be set. In the above sample data, for example, the system has been configured for up to eight moves where moves 4–8 have received values of negative one as a data terminator or delimiter.

The following Table B defines variables referenced in FIG. 4 that relate to known values that are entered by the user or otherwise known to the system prior to generating a path planning table. The initial values of the alpha and beta variables are described in more detail later.

TABLE B

Alpha: Velocity to Acceleration Ratio for specific machinery.
Beta: Acceleration to Deceleration Ratio for specific machinery.
Spd: The Maximum Speed of the Servo Motor in (in/s).
Acc: The Maximum Acceleration iof the Servo Motor in (in/s/s).
VLR: Normalized Peak Velocity Limit Ratio (no units).
ALR: Normalized Peak Acceleration Limit Ratio (no units).

Referring to FIG. 3, a method of multi-axis path planning in a motion control system is illustrated. Data is entered at step 44, as previously described, which corresponds to a series of successive moves in a cycle of the multi-axis machine 28. Alpha and beta variables are set to a predetermined or initial value at step 46. The alpha variable corresponds to a velocity to acceleration ratio and the beta variable corresponds to an acceleration to deceleration ratio. These variables are described in more detail later and are parameters for user tuning of the generated path planning table 40 to increase motor performance.

The path planning table 40 is generated from the move data at step 48 to determine calculated positions which define a path of the entered cycle by applying a curve defining equation and integrating the alpha and beta variables into the curve defining equation. The path planning program 42 of the present invention is repeated for each axis of control to generate the table 40 and is described in more detail below, as well as being illustrated in the flowchart of FIG. 4. The path generated will have an initial velocity and accelerating profile. At step 50, the motor performance is determined during machine operation. The motor performance is preferably tested by connecting chart recorders of conventional design to each of the motors to monitor the characteristics of each of the motor's performance and to determine motor performance values including peak velocity, acceleration and torque.

At step 52, the results of the motor performance are analyzed by a user and compared with known performance values which are attainable by each motor when optimized, such as those velocity, acceleration, and torque ratings provided by a motor manufacturer in a motor specification. At step 54, a determination is made based on the previous analysis whether or not to modify the alpha and beta variables. If modification is deemed advantageous to improve performance or to otherwise tune the responsiveness of the motors, a user will enter a new values for alpha and beta at step 56. Accordingly, a new path planning table will be generated using the new alpha and/or beta value. The new path will have a velocity and acceleration profile shifted from an initial or pervious velocity and acceleration profile to provide improved motor performance, as later described and illustrated in FIGS. 5A–5C and 6A–6C. Once an optimal value of alpha is determined through loop 58, the machine 28 is ready for normal operation at step 60.

Referring now to FIG. 4, the path planning program 42 of a preferred embodiment of the present invention is illustrated. When the program 42 is first executed, move duration array X(1)–X(16) is conditioned at step 62 with the start angles SA1–SA8 and end angles EA1–EA8 from Table A. At step 64, move displacement array Y(1)–Y(16) is conditioned with the displacement values EP1–EP8 from Table A. At step 66, initial path degree variable X0, initial axis position Y0, and move loop counter X are initialized.

At step 68, second path degree X1 is set at X(X) and second axis position Y1 is set at Y(X) for purposes of looping the various moves in the path of Table A in loop 70. If X(X) or Y(X) is negative, as shown at step 72, this would indicate reaching the table delimiter and the value of X would be incremented at step 74. Additionally, if X is greater than 17 at step 76, which corresponds to the presently selected size of the table illustrated herein, then loop 70 would be complete where all the respective moves have been processed. In steps 78a and 78b, rotary rollover is compensated for where a move start angle is greater than the end angle which would dictate that rotary rollover from 360° has occurred. At step 80, X0 and X1 are compared to determine if the start and end angles are the same. If so, the particular move being processed is complete and the setup for the next move angle X0 and next move position Y0 are set at step 82 and X is incremented at step 74.

At step 84, Y0 and Y1 are compared to determine if the start and end positions are the same. If so, loop 86 has been completed which determines the maximum rate of speed for traversing through the path planning table or position arrays during machine operation. If the start and end positions Y0,Y1 are not the same, the maximum rate of speed is checked at step 88 with the following equation: SS=Spd* (X1−X0)/ABS(Y1−Y0)/VLR. The SMAX variable, which will hold the maximum rate of speed, is checked with the value of SS and adjusted accordingly at steps 90a and 90b. The maximum acceleration is checked at step 92 with the following equation: SS=Acc*(X1−X0)/ABS(Y1−Y0)/ALR. The SMAX variable is checked with the value of SS and adjusted accordingly at steps 94a and 94b. Accordingly, SMAX will hold the maximum rate of speed based on the velocity and accelerations calculations above. By the foregoing routine, SMAX will ultimately acquire the single maximum rate of speed for all moves of a path for as many axes as the program 42 executes. After finishing loop 86, point loop counter P is set to move start angle X0 at step 96 for use in the following steps.

Loop 98 generates the position array P(L). Where the program 42 can be executed for any desired number of axes, the particular position array P(L) generated within FIG. 4, can be stored in memory for each axis as XP(L), YP(L), ZP(L), and so forth. It should be understood that the designation of a path planning table could represent the aforementioned values stored in a table format or simply as referring to the respective P(L) arrays of all axes of a machine collectively, and such terms may be used interchangeably herein.

At step 100, transition variable Z, which linearly ranges between 0 and 1, is defined by the following equation: Z=(P−X0)/(X1−X0). At step 102, the beta variable corresponding to the acceleration to deceleration ratio is introduced by the following equation: Z=ATAN(Z/beta)/ATAN (1/beta). At step 104, the alpha variable corresponding to the velocity to acceleration ratio is introduced by the following equation: Z=(TAN((Z−0.5)/alpha)+TAN(0.5/Alpha))/TAN (0.5/alpha)/2. A common 3-4-5 polynomial S-curve equation is utilized at step 106. However, the equation has been modified in accordance with the present invention to integrate the alpha and beta variable therein. The resulting equation is as follows: $F=10*Z^3-15*Z^4+6*Z^5$. The equation L=P MOD 360 is used at step 108 to calculate the normalized position in degrees so that mathematical rollover at 360 degrees is taken into consideration. The generated curve is placed into the final P(L) array at step 110 by the following equation: P(L)=(Y1−Y0)*F+Y0. P is incremented at step 112 and is compared with X1 at step 114 to determine if P is greater than the end angle. If not, loop 98 continues to calculate the remaining positions for the move. If P is greater than X1, loop 98 exits to step 82, which has been previously described.

A fundamental aspect of the present invention is to eliminate the steady-state velocity from a move. By removing the steady-state velocity, the motion controller is delivering a force signal in the form of acceleration or deceleration throughout the move and accordingly the machine does not adversely respond to non-linear mechanical properties such as belt-slip, gear cogging, ball-screw backlash, and the like.

Figure 5A:
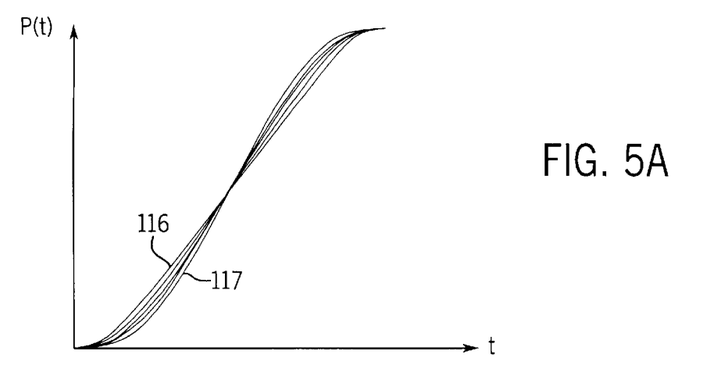
FIGS. 5A–5C are graphical illustrations of position, velocity, and acceleration curves shifted by adjusted alpha variable values.
Figure 5B:
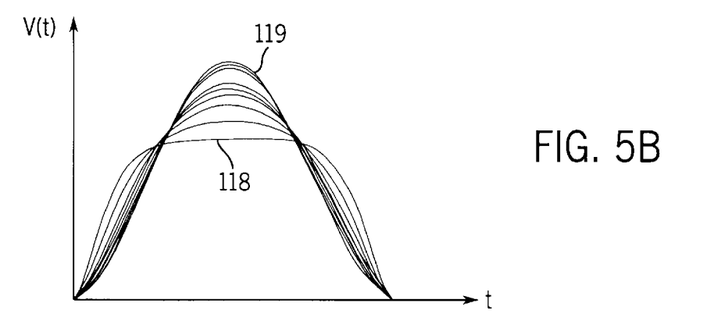
Figure 5C:
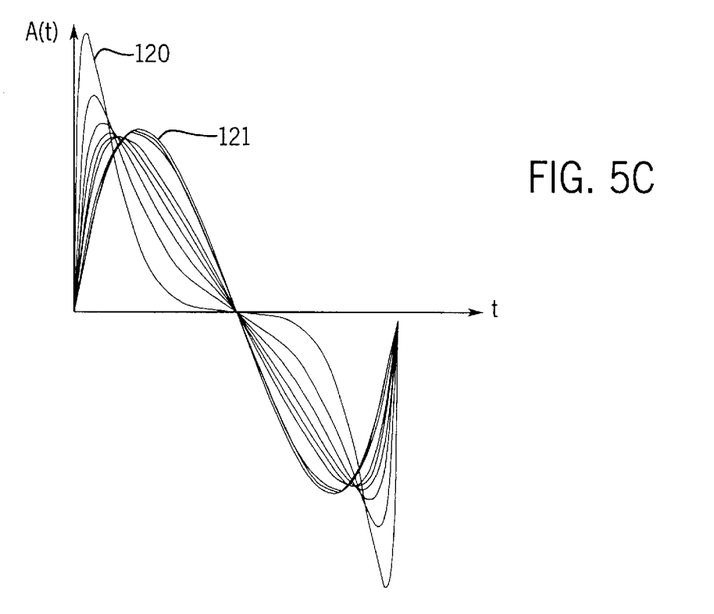

Referring to FIGS. 5A–5C, position, velocity, and acceleration curves and profiles thereof of a single normalized function are illustrated. Multiple curves are illustrated which have been generated using varied alpha values ranging between a low value and infinity. By adjusting the value of alpha, a user has a better ability to match the motors speed/torque curves because peak torque or acceleration can be placed at lower velocity points. Where alpha is set at a very high value which would mathematically correspond to a resulting curve where alpha is set to infinity, alpha will not provide any shift in a respective curve generated by a curve defining equation, such as the 3-4-5 polynomial equation illustrated above. In FIG. 5A, line 116 illustrates a position curve generated by a low alpha value. Line 117 illustrates a position curve generated by an infinitely large alpha value. In FIG. 5B, line 118 illustrates alpha at a low value and line 119 illustrates alpha at an infinitely large value. In FIG. 5C, line 120 illustrates alpha at a low value and line 121 illustrates alpha at an infinitely large value.

Figure 6A:
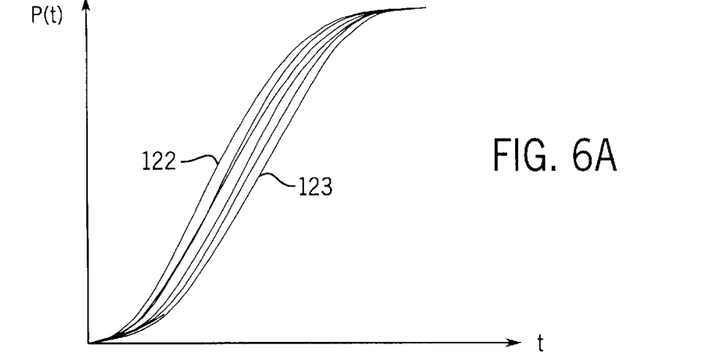
FIGS. 6A–6C are graphical illustrations of position, velocity, and acceleration curves shifted by adjusted beta variable values.
Figure 6B:
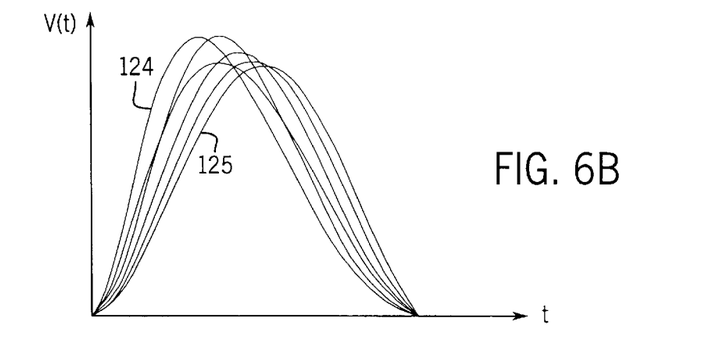
Figure 6C:
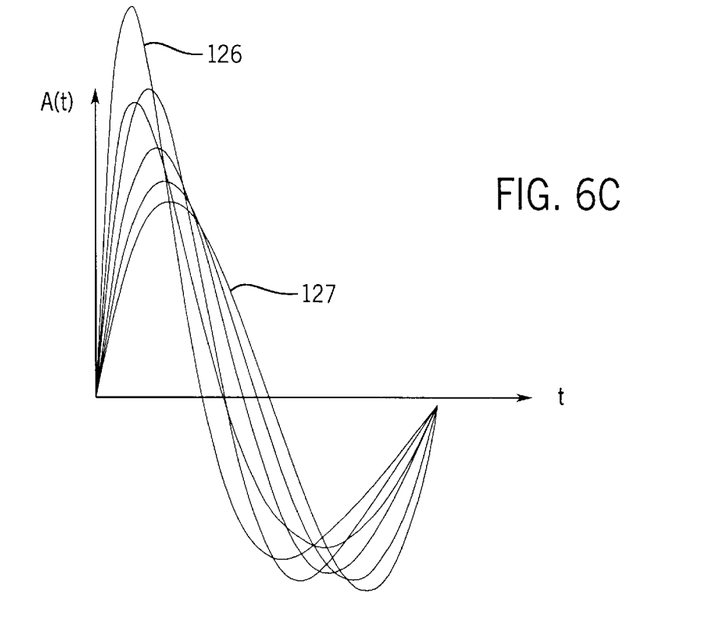

Referring to FIGS. 6A–6C, position, velocity, and acceleration curves and profiles thereof are illustrated which have been generated using varied beta values ranging between a low value and infinity. By adjusting the value of beta, a user can shift the move towards having a higher acceleration while at the same time reducing the deceleration value. Accordingly, compensation can be made for machines having high inertia loads. When beta is set at a very high value, this mathematically corresponds to a resulting curve where beta is set to infinity and no curve shift occurs. If a user did not want to adjust beta, for example, beta could be left at a high value. In FIG. 6A, line 122 illustrates a position curve generated by a low beta value. Line 123 illustrates a position curve generated by an infinitely large beta value. In FIG. 6B, line 124 illustrates beta at a low value and line 125 illustrates beta at an infinitely large value. In FIG. 6C, line 126 illustrates beta at a low value and line 127 illustrates beta at an infinitely large value.

Referring back to FIG. 3, the alpha and beta variables are set to a predetermined or initial value at step 46. It has been found that initially setting alpha and beta at values of 1000.0 will allow the resulting curves to be generated without the influence of alpha and beta so that a user at step 50 may determine initial motor performance of the system. The use of chart recorders and other motor performance test units to determine motor performance is well known in the art and accordingly such details are not being provided herein. It has been found that alpha typically ranges between 0.53 and 12.0, where the value of 12.0 would be high enough to represent an infinity value for alpha. Beta typically ranges between 0.8 and 10.0, where the value of 10.0 would be high enough to represent an infinity value for beta To set the optimal values of alpha and beta, alpha and beta can be set at the high range of 12.0 and 10.0 respectively, where the user would repeat the testing process and lower the values of alpha and beta at step 56 until an optimal value was found at step 54. The repeated process of comparing performance values with modified values for alpha or beta, provides one means for determining optimal values. In other circumstances, a user may have additional criteria to base modifications. For example, in a particular application the machine may need to operate in a predetermined cycle time, such as a 6.0 second cycle. The path planning method of the present invention would be employed as previously described where alpha would be modified until the motor performance allowed a 6.0 second cycle or other predetermined time to be reached.

When beta is being examined, a user may determine that the machine is overshooting a target point. Accordingly, by modifying beta, compensation for a machine having a large inertia load can be made so that more time is allowed for deceleration and overshooting is thus prevented. In prior art systems, cycle time is often lost to maintain load movement stability. Now, a user can fine-tune the load movement to match the machine's reactivity capability, thus increasing speed and performance.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. Method of multi-axis path planning in a motion control system having an input device for receiving data, a motion controller operatively connected to the input device for executing a path planning table based on said data to generate commands to control electric motors of a multi-axis machine operatively connected therewith, the method comprising the steps of:

inputting data corresponding to a series of successive moves in a cycle of the multi-axis machine;

setting an alpha variable to a predetermined value, the alpha variable corresponding to a velocity to acceleration ratio;

generating said path planning table from said data to determine calculated positions defining a path of the cycle by applying a curve defining equation and integrating the alpha variable into said curve defining equation, said path having an initial velocity and acceleration profile;

determining a rate of speed for traversing along the path planning table during machine operation;

determining motor performance during machine operation;

modifying the alpha variable in response to the motor performance and generating a new path planning table having a velocity and acceleration profile shifted from said initial velocity and acceleration profile.

2. The method of claim 1, further comprising the steps of setting a beta variable to a predetermined value, integrating the beta variable into said curve defining equation, the beta variable corresponding to an acceleration to deceleration ratio, the value of the beta variable being adjustable to allow for an optimal setting thereof corresponding to a shift in the velocity and acceleration profile providing user adjusted compensation for high inertia load of said machine.

3. The method of claim 1, wherein the curve defining equation is a 3-4-5 polynomial equation.

4. The method of claim 1, wherein the step of generating the path planning table from said data includes iteratively applying the curve defining equation to generate an array for each axis of the multi-axis machine.

5. The method of claim 1, wherein the step of determining the rate of speed includes determining the maximum rate of speed for the multi-axis machine based on the generated path planning table.

6. The method of claim 5, where the step of determining the maximum rate of speed includes comparing the maximum rate of speed at each position along the path planning table with a predetermined maximum speed for each axis of the machine and setting the maximum rate of speed to the lowest value thereof.

7. The method of claim 1, wherein the data corresponding to the series of successive moves in the cycle of the multi-axis machine includes a starting angle, ending angle, and designation value for each move of said series of successive moves.

8. The method of claim 1, wherein the curve defining equation includes a beta variable integrated therein, the beta variable corresponding to an acceleration to deceleration ratio, the value of the beta variable being adjustable to allow for an optimal setting thereof corresponding to a shift in the velocity and acceleration profile to compensate for high inertia load of said machine.

9. Method of multi-axis path planning having tunable parameters in a motion control system having an input device for receiving data, a motion controller operatively connected to the input device for executing a path planning table based on said data to generate commands to control electric motors of a multi-axis machine operatively connected therewith, the method comprising the steps of:

inputting data corresponding to a series of successive moves in a cycle of the multi-axis machine;

setting an alpha and beta variable to a predetermined value, the alpha variable corresponding to a velocity to acceleration ratio, the beta variable corresponding to an acceleration to deceleration ratio;

generating a path planning table from said data to determine calculated positions defining a path of the cycle by applying a curve defining equation and integrating the alpha and beta variables into said curve defining equation, said path having an initial velocity and acceleration profile;

determining motor performance during machine operation;

modifying the alpha and beta variables in response to the motor performance and generating a new path planning table having a velocity and acceleration profile shifted from said initial velocity and acceleration profile to provide improved motor performance.

10. The method of claim 9, further comprising the step of determining a maximum rate of speed for traversing along the path planning table during machine operation.

11. The method of claim 10, wherein the curve defining equation is a 3-4-5 polynomial equation.

12. The method of claim 10, wherein the step of generating the path planning table from said data includes iteratively applying the curve defining equation to generate a position array for each axis of the multi-axis machine.

13. The method of claim 10, where the step of determining the maximum rate of speed includes comparing the maximum rate of speed at each position along the path planning table with a predetermined maximum speed for each axis of the machine and setting the maximum rate of speed to the lowest value thereof.

14. The method of claim 13, wherein the data corresponding to the series of successive moves in the cycle of the multi-axis machine includes a starting angle, ending angle, and designation value for each move of said series of successive moves.

15. A motion controller for providing multi-axis control of electric motors of a multi-axis machine, the controller comprising:

input means for receiving data corresponding to a cycle of the multi-axis machine;

control means operatively connected with said input means for controlling the motors of the machine in accordance with calculated positions along a path set forth in a path planning table, said control means having a processor and memory means for storing said path planning table;

means for generating the path planning table with said processor by calculating said path planning table from said data to determine calculated positions defining a path of the cycle by iteratively applying a curve defining equation and integrating an alpha variable therein, the alpha variable corresponding to a velocity to acceleration ratio, said path have an initial velocity and acceleration profile, the alpha variable being adjustable to allow recalculating of a new path planning table having a velocity and acceleration profile shifted from said initial velocity and acceleration profile.

16. The motion controller of claim 15, further comprising means for determining a maximum rate of speed for traversing along the path planning table during machine operation.

17. The motion controller of claim 15, wherein the alpha variable is initially set to a predetermined value stored in said memory means, the alpha variable being progressively adjusted to determine an optimal value thereof.

18. The motion controller of claim 15, wherein the curve defining equation is a 3-4-5 polynomial equation.

* * * * *